United States Patent [19]

Säberg

[11] 4,235,018
[45] Nov. 25, 1980

[54] DEVICE FOR USE IN MEASURING THE THICKNESS OF SURFACE LAYERS AND COATINGS

[76] Inventor: Ove Säberg, 3, Vibrafonvägen, S-245 00, Staffanstorp, Sweden

[21] Appl. No.: 32,795

[22] Filed: Apr. 24, 1979

[30] Foreign Application Priority Data

Apr. 27, 1978 [GB] United Kingdom ............... 16750/78

[51] Int. Cl.³ .......................... G01B 5/02; G01B 11/02
[52] U.S. Cl. ................................... 33/169 F; 73/150 R
[58] Field of Search ................. 73/159, 150; 408/1 R, 408/2, 16, 72 B, 97, 115; 33/169F

[56] References Cited

U.S. PATENT DOCUMENTS 2,936,659  5/1960  Berlin et al. .......................... 408/115
3,320,810  5/1967  Stamulus .............................. 73/150
3,340,615  9/1967  Tooke, Jr. ............................ 33/169 F Primary Examiner—S. Clement Swisher
Attorney, Agent, or Firm—Lawrence Rosen

[57] ABSTRACT

A device for measuring the thickness of coatings comprises a rotatable drill, the cutting edge or edges of which are at a 45° angle to the axis of the drill. The drill is manually operated by means of a finger disc and guided and steadied during its operation in a through-going bore in a guide plate resting with an anti-slide surface on the coated surface, the thickness of whose coating is to be determined. The conical cut made by the drill is observed in a microscope, and the width of the circular band is noted on an in-built micrometer scale. Owing to the cutting angle being 45°, the said width is equal to the thickness of the coating.

4 Claims, 6 Drawing Figures

DEVICE FOR USE IN MEASURING THE THICKNESS OF SURFACE LAYERS AND COATINGS

The invention relates to a device for use in measuring the thickness of surface layers and coatings, particularly coatings of paints, lacquers and the like.

Known techniques of measuring the often very thin coatings of paints, primers, lacquers and the like, do not readily yield exact and reproducible results, and one object of the present invention, therefore, is to provide a device, which, while being of simple design, is easy to use whether in the laboratory or in the field, and produces reliable results with only slight damage to the coating.

According to this invention a device for use in measuring the thickness of surface layers and coatings comprises a drill, the cutting edge or edges of which are at an angle of 45° with the axis of the drill, one end of the drill being secured in means for rotating the drill, and a guide plate having extending there-through a hole bore for guiding and steadying the drill during the operation thereof.

Preferably, the drill has cutting edges at both ends, so that it can be reversed when the cutting edge or edges at one end are blunted by use.

Figure 1:
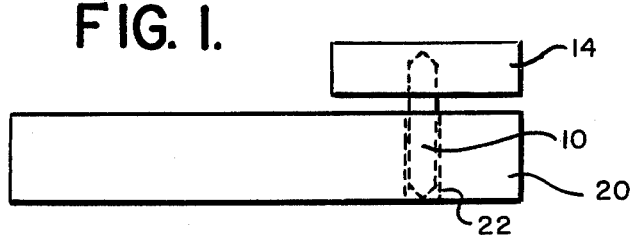
Figure 2:
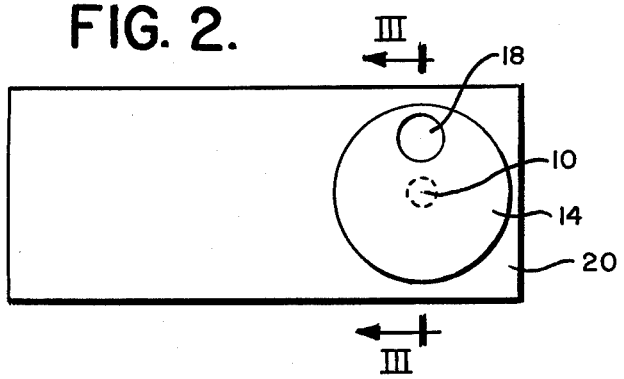
Figure 3:
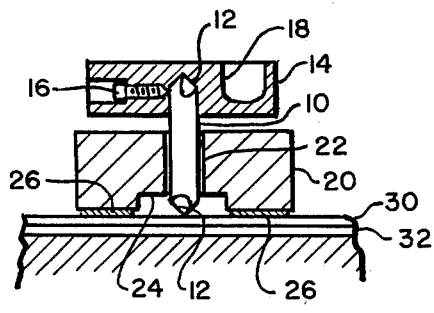
Figure 4:
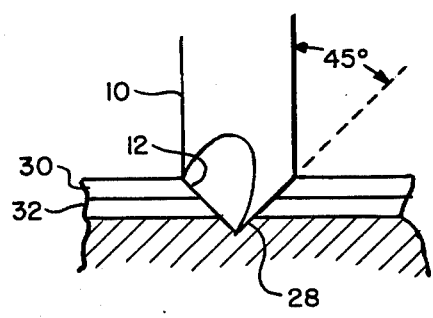
Figure 5:
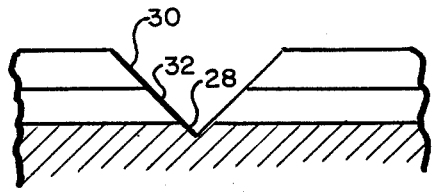
Figure 6:
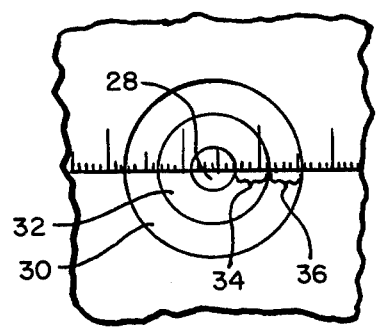

An embodiment of the invention will now be described by way of example with reference to the accompanying drawings of which:

FIG. 1 is a side elevation of a measuring device,

FIG. 2 a plan view of the device shown in FIG. 1,

FIG. 3 a cross-sectional view along line III—III in FIG. 2,

FIG. 4 is a part sectional view on a larger scale, showing the working end of the drill of its performance, FIG. 5 is a sectional view of the cut made by the drill, and FIG. 6 illustrates the measuring of the cut.

Referring now to FIGS. 1 to 4, a drill 10 with cutting edges 12 at both ends, forming an angle of 45° with the drill axis, is inserted in a disc 14 and secured therein by a screw 16. A recess 18 serving as finger grip 18 in the disc is used for rotating the disc and drill by hand.

A guide plate 20 with a through-going bore 22 serves to guide and steady the drill during operation and is slightly recessed on its underside as shown at 24 in FIG. 3, strips of sand paper 26 or the like being pasted on the contact areas of the bottom side to prevent the guide plate from sliding while the drill is operated.

The drill 10 is rotated to cut a recess 28 through the layers 30 and 32, the thickness of which is to be measured, (FIGS. 5 and 6).

Measurements are made by placing a microscope with a micrometer scale over the recess 28, which is only about the size of a pin head. Since the recess is cut at an angle of 45°, the readings of the width of the circular bands 34 and 36 as seen in the microscope are equal to the thickness of the layers 30 and 32.

What I claim is:

1. A device for use in measuring the thickness of surface layers and coatings, comprising a drill having at least one cutting edge, each said cutting edge forming an angle of 45° with the axis of the drill; means for retaining said drill and for rotating same relative to drill guide means; drill guide means comprising a guide plate having a bore extending therethrough dimensioned to guidingly and rotatably receive said drill during the operation thereof; and reticle means for measuring the width of circular bands formed in the layer or drilled by said drill.

2. A device according to claim 1 in which the said drill-retaining means comprises a disc having a hole receiving one end of the drill, and a recess to assist gripping of the disc to rotate the drill by hand.

3. A device according to claim 1 in which the drill has cutting edges at both sides.

4. A device according to claim 1 in which the guide plate is slightly recessed on the bottom side, the contact areas on which the plate rests being provided with a slide-preventing surface.

* * * * *